US010126726B2

(12) United States Patent
Nagatani et al.

(10) Patent No.: US 10,126,726 B2
(45) Date of Patent: Nov. 13, 2018

(54) APPARATUS AND METHOD FOR GENERATING PROGRAM

(71) Applicant: Mitsubishi Electric Corporation, Tokyo (JP)

(72) Inventors: Tatsuya Nagatani, Tokyo (JP); Hideaki Minamide, Tokyo (JP); Tsutomu Yoshikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/564,470

(22) PCT Filed: Jul. 10, 2015

(86) PCT No.: PCT/JP2015/069878
§ 371 (c)(1),
(2) Date: Oct. 5, 2017

(87) PCT Pub. No.: WO2017/009895
PCT Pub. Date: Jan. 19, 2017

(65) Prior Publication Data
US 2018/0074470 A1     Mar. 15, 2018

(51) Int. Cl.
*G05B 19/042*     (2006.01)
*G05B 17/02*     (2006.01)
*G05B 19/05*     (2006.01)

(52) U.S. Cl.
CPC ......... *G05B 19/0423* (2013.01); *G05B 17/02* (2013.01); *G05B 19/05* (2013.01);
(Continued)

(58) Field of Classification Search
CPC .... G05B 19/0423; G05B 17/02; G05B 19/05; G05B 2219/21079; G05B 2219/21063
See application file for complete search history.

(56) References Cited

U.S. PATENT DOCUMENTS 6,598,108 B1    7/2003   Ashida et al.
7,725,877 B2 *   5/2010   Andrade ................... G06F 8/34
                                                        717/107
(Continued)

FOREIGN PATENT DOCUMENTS

JP        7-28390 A     1/1995
JP    2001-22401 A     1/2001
(Continued)

OTHER PUBLICATIONS

International Search Report dated Aug. 27, 2015 in PCT/JP2015/069878 filed Jul. 10, 2015.
Hitoshi Kidokoro, "Why Model-Based Development is Focused on Now", Nikkei Electronics, Jul. 23, 2012, p. 96-102.
International Preliminary Report on Patentability and Written Opinion dated Jan. 25, 2018 in PCT/JP2015/069878 with English translation.
(Continued)

*Primary Examiner* — Charles R Kasenge
(74) *Attorney, Agent, or Firm* — Oblon, McClelland, Maier & Neustadt, L.L.P.

(57) ABSTRACT

A technique for enabling reduction in user operations. A program generating apparatus includes a control distribution unit and a communication function adding unit. The control distribution unit allocates respective control blocks of a control model to controllers, based on the control model received by a control model input unit, and setting information and connection information received by a setting information input unit. The communication function adding unit adds, when first and second ones of the control blocks are connected to each other, a communication control block to a connected part between the first and second control blocks, the first and second control blocks being allocated to different ones of the controllers in the allocated control model.

5 Claims, 9 Drawing Sheets

(52) U.S. Cl.
CPC .............. *G05B 2219/21063* (2013.01); *G05B 2219/21079* (2013.01)

(56) References Cited

U.S. PATENT DOCUMENTS

| | | | | |
|---|---|---|---|---|
| 7,996,782 | B2* | 8/2011 | Hayles | G06F 3/04817 |
| | | | | 715/763 |
| 8,108,784 | B2* | 1/2012 | Hayles | G06F 3/0484 |
| | | | | 715/762 |
| 8,983,632 | B2* | 3/2015 | Wacker | G05B 19/042 |
| | | | | 700/22 |
| 9,658,741 | B2* | 5/2017 | Pauly | G06F 3/04842 |
| 2005/0155014 | A1* | 7/2005 | Andrade | G06F 8/34 |
| | | | | 717/105 |
| 2008/0004725 | A1* | 1/2008 | Wacker | F24F 11/0009 |
| | | | | 700/83 |
| 2008/0034299 | A1* | 2/2008 | Hayles | G06F 3/0484 |
| | | | | 715/763 |
| 2008/0307332 | A1* | 12/2008 | Hayles | G06F 3/04817 |
| | | | | 715/764 |
| 2012/0253482 | A1* | 10/2012 | Wacker | G05B 19/042 |
| | | | | 700/23 |
| 2015/0309716 | A1* | 10/2015 | Pauly | G06F 3/04842 |
| | | | | 715/771 |

FOREIGN PATENT DOCUMENTS

| | | |
|---|---|---|
| JP | 2001-209407 A | 8/2001 |
| JP | 2004-213183 A | 7/2004 |
| JP | 2005-251116 A | 9/2005 |
| JP | 2006-48284 A | 2/2006 |
| JP | 2007-122373 A | 5/2007 |
| JP | 2015-53022 A | 3/2015 |

* cited by examiner

APPARATUS AND METHOD FOR GENERATING PROGRAM

TECHNICAL FIELD

The present invention relates to a program generating apparatus that generates a program for controlling a control target apparatus including a plurality of controllers and input-output devices connected to the respective controllers, and to a program generating method for generating the program.

BACKGROUND ART

Techniques having a function of simulating a program of each controller that includes a setting of communication through simulating a function of communicating between controllers have been proposed as program generating apparatuses that generate a program for controlling a production facility through a plurality of controllers (for example, Patent Document 1).

Furthermore, programming software for model-based development that can design, by combining control blocks, a control model of controllers or a model to be controlled to enable simulation of the controllers including the model to be controlled is known (for example, Non-Patent Document 1).

PRIOR-ART DOCUMENTS

Patent Document

Patent Document 1: Japanese Patent Application Laid-Open No. 2001-209407

Non-Patent Document

Non-Patent Document 1: Hitoshi KIDOKORO, "Why Model-Based Development is Focused On Now", NIKKEI ELECTRONICS, Jul. 23, 2012, p. 96-102

SUMMARY

Problems to be Solved by the Invention

According to the technique of Patent Document 1, implementation of the simulation requires a program for causing controllers to actually operate, where the program includes detailed settings of a system. Thus, even when simple verification of only operations of a machine is desired in early stages of designing a production facility to measure the production capacity of the production facility, detailed settings of the controllers are necessary to operate the machine. In other words, the operator needs to set parameters and describe a program for communication between controllers. However, since such operations involve an operation of developing a program to synchronize data between a plurality of controllers that independently operate, the operator needs to understand the control timing of each of the controllers and communication requirements of the controllers. Thus, there has been a problem of the need for the operator to acquire skills. Since the timing to execute a communication program is also closely related to the timing to execute the other processes in a controller and between controllers, designing a program is complicated, and may take approximately half a day of an operating time. When a specification, for example, data to be communicated between the controllers has been changed, the program may require a redesign and an operating time equivalent to the time for the initial design.

The technique of Non-Patent Document 1 has a problem of causing the operator to manually decompose a plurality of control blocks included in a controller model for simulation into actual controls of the respective controllers as a preliminary step of designing a program for each of the controllers. This operation requires the operator not only to understand the specification of each of the controllers but also to have the ability to optimally decompose a controller model into controls of the controllers by checking the configuration of the actual production facility. Thus, there has been a problem of the need for the operator to acquire skills.

The present invention has been conceived in view of such problems, d has an object of providing a technique capable of reducing the user operations.

Means to Solve the Problems

A program generating apparatus according to the present invention is a program generating apparatus that generates a program for controlling a control target apparatus including a plurality of controllers and input-output devices connected to the respective controllers, and includes: a processor to execute a program; and a memory to store the program which, when executed by the processor, performs processes of: performing a control model receiving process that receives a control model represented by connecting a plurality of control blocks on the control target apparatus, the control model being translatable into the program; performing a setting information receiving process that receives setting information of the plurality of controllers, and connection information between the controllers and between the controllers and the input-output devices; performing a control distribution process that allocates the respective control blocks of the control model to the controllers, based on the control model received in the control model receiving process, and the setting information and the connection information received in the setting information receiving process; and performing a communication function adding process that adds, when first and second ones of the control blocks are connected to each other, a communication control block to a connected part between the first and second control blocks, and that determines data processing to be performed by the communication control block, based on the control model received in the control model receiving process and the setting information received in the setting information receiving process, the first and second control blocks being allocated to different ones of the controllers in the allocated control model, the communication control block including a function of performing the data processing on communication data output from one of the first and second control blocks and of inputting the communication data to the other of the first and second control blocks, the data processing being relevant to a control period.

Effects of the Invention

According to the present invention, the respective control blocks of the control model are allocated to the controllers based on the control model received by the control model input unit, and the setting information and the connection information received by the setting information input unit. When first and second ones of the control blocks that are allocated to different ones of the controllers in the allocated control model are connected to each other, a communication control block is added to a connected part between the first and second control blocks. Consequently, operations of the user who understands the specifications of the controllers and develops a program can be reduced.

The object, features, aspects and advantages of the present invention will become more apparent from the following detailed description and the accompanying drawings.

DESCRIPTION OF EMBODIMENTS

Embodiment 1

Figure 1:
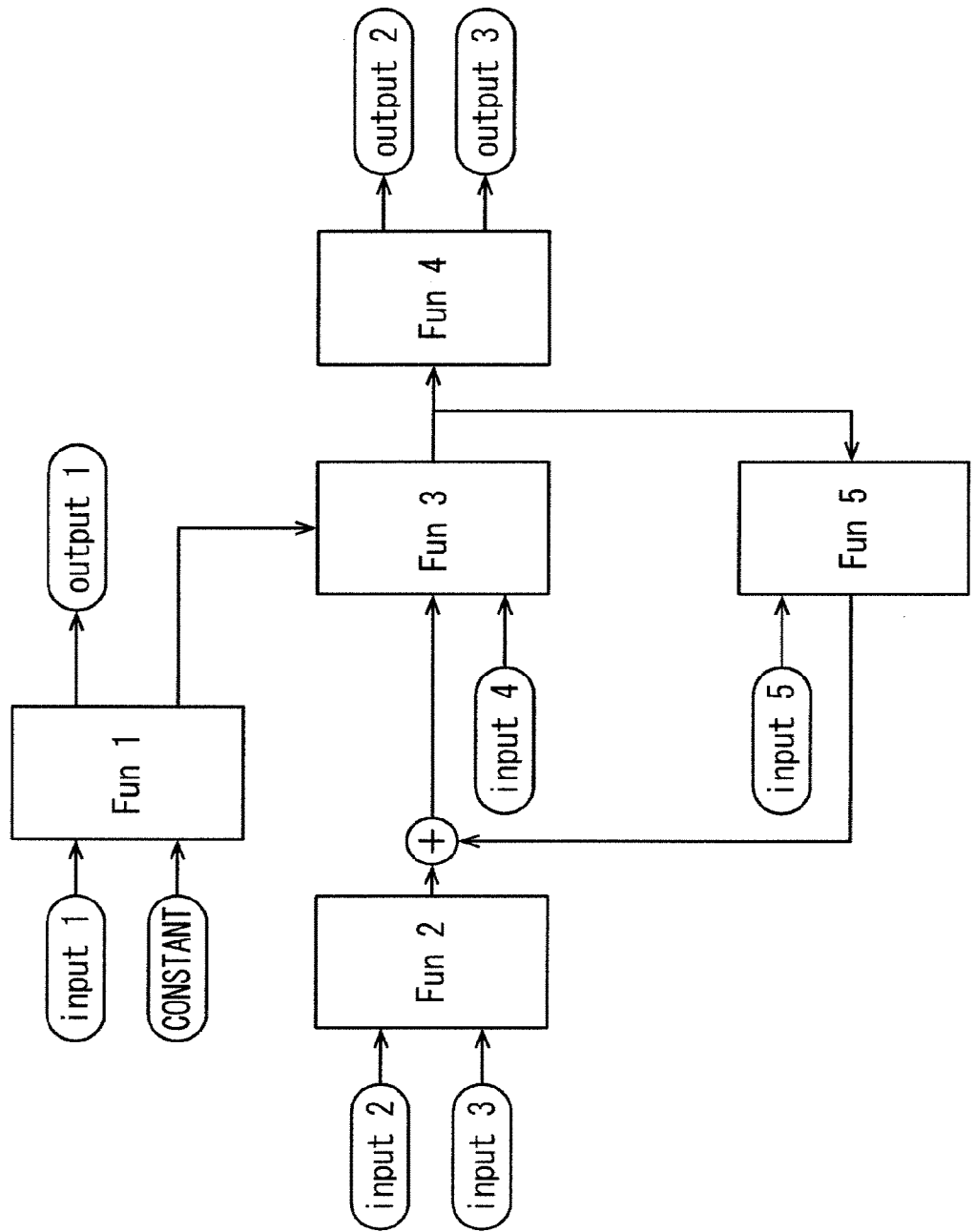
FIG. 1 illustrates an example of a control model.

A program generating apparatus according to Embodiment 1 of the present invention generates a program for controlling a control target apparatus including a plurality of controllers and input-output devices connected to the respective controllers. A production apparatus for plant (for example, a semiconductor manufacturing apparatus and an automatic machine) is used as an example of the control target apparatus.

Before describing the program generating apparatus according to Embodiment 1 in detail, a factory automation controller that is one kind of controller will be simply described. The factory automation controller mainly used for controlling a production apparatus for plant is connected to a plurality of input-output devices, and controls these devices. Examples of the input-output devices include an input device for a controller such as a sensor and a switch, and an output device that performs a certain operation according to an output signal from a controller such as an indicator lamp and a motor.

A connection (connected part) of input-output devices and a connection (connected part) between a controller and an input-output device will be collectively referred to as input/output (I/O). Since a production apparatus includes various I/Os whose control methods are different from one another, it frequently uses a combination of controllers to enable appropriate control of the respective I/Os. The input-output devices connected to the respective controllers are frequently used for communication between a production apparatus and a controller of another apparatus.

Although I/Os on discrete events such as a start switch and an indicator lamp of an apparatus are connected to many devices, immediate control of the I/Os is not strongly required. Thus, approximately several milliseconds of the control period cause no problem, and the constancy of the control period is not strongly required under the control of the I/Os. In contrast, under the control of servomotors, a command value needs to be sent to a servo amplifier at a control period which is constant, i.e., approximately 100 µsec and with which immediate control can be performed.

Under the former control of the I/Os on many discrete events, factory automation controllers referred to as programmable logic controllers (PLCs) are frequently used. The PLCs are superior in extensibility of connecting terminals to be connectable to many devices. In many cases, the PLCs can execute a best-effort processing mode whose control period is inconstant, and a processing mode in which processes at a plurality of constant periods can be performed in parallel, so that the PLCs can be connected to many miscellaneous devices.

Since the latter control of servomotors requires sending a command value to a servo amplifier at a constant period and performing complicated computations to generate a command value of a motor, factory automation controllers specifically designed to control the servomotors called servo system controllers are frequently used. Here, factory automation controllers having both functions of the PLCs and the servo system controllers may be used for controlling the servomotors.

A plurality of controllers are sometimes used in view of its processing load or wiring. If a controller cannot exhibit sufficient processing performance with respect to the target performance of a production apparatus, the target performance may be reserved by distributing processes to a plurality of controllers. The controllers may be arranged in a distributed manner in an apparatus to shorten the wiring between the controllers and devices. Here, the wiring for data communication can be reduced by connecting the controllers via, for example, an Ethernet (trademark)-based network.

Conventional designing and development of programs on typical production apparatuses start with consideration of a takt time and the mechanical design based on a timing chart. The next comes with the electrical design including wiring of the controllers and input-output devices based on the timing chart, and the operational design of a machine defined by the complete mechanical design. The last comes with the control design of each of the controllers.

The design based on the timing chart is predicated on the experience and design assets, and such design ends up with a rough estimate of a takt time from its mechanism and operations. Thus, calculation accuracy of the takt time is not high. Verification of interference of the machine, etc. is also difficult. A takt time can be calculated with high accuracy in the final stages where the control design is completed. If the target performance is not achieved, the number of debugging man-hours increases.

In the model-based development environment that has recently been proposed, both a mechanical model and a control model are developed in early stages of the design, and whether the mechanical model can be controlled to satisfy the target performance is verified. Through these processes, the number of debugging man-hours when the target performance is not achieved can be reduced in relatively early stages. Since the main factor in determining a takt time of a production apparatus is an operating time of a machine, a simple control model only for operating the machine is frequently developed in early stages of the design.

Here, a technique for translating a control model into a program that can be processed even by a factory automation controller is known. However, this technique merely generates a program that behaves similarly as a control model. In other words, even when a control program that can be processed even by a factory automation controller is generated from a simple control model only for operating a machine, specifically, from a control model excluding constraints such as setting information of each controller and connection information between the controllers and I/Os, the control program does not take such constraints into account. Thus, an actual controller can hardly use the control program.

Thus, making the control program usable by an actual controller requires the control model to be decomposed into controls of the respective controllers to satisfy the constraints of each of the controllers. Furthermore, exchanging data between different controllers requires a program for communication to be added during the exchange. However, under the conventional techniques, the operator who understands the specification of each of the controllers manually decomposes the control model or adds the communication program, which has not been easy.

In contrast, the program generating apparatus of Embodiment 1 has a function of dividing, according to actual configurations of controllers, a control model (controller model) generated based on various constraints and setting conditions with disregard of the actual configuration of the controller and connection information of the I/Os, and a function of adding a program for communication, which will be described later. Since the program generating apparatus of Embodiment 1 can perform the decomposition according to the actual configurations of controllers and add a program for communication as described above, the operations of the user who understands the specifications of the controllers and develops a program can be reduced.

FIG. 1 illustrates an example of a control model that is translatable into a program for controlling a production apparatus. In general programming of the model-based development, a model is described in a graphical language as illustrated in FIG. 1.

As illustrated in FIG. 1, the control model is represented by connecting a plurality of control blocks on the production apparatus. Here, the control blocks include control process blocks such as Funs 1 to 5 in FIG. 1, input processes such as inputs 1 to 5 in FIG. 1, and output processes such as outputs 1 to 3 in FIG. 1.

When the control process block of Fun 1 is distinguished from the other control process blocks, it will be described as a "control process block Fun 1" in the following description. Funs 2 to 5 will be described in a similar manner.

Similarly, when the input process of input 1 is distinguished from the other input processes, it will be described as an "input-1 process" in the following description. Inputs 2 to 5 will be described in a similar manner. Similarly, when the output process of output 1 is distinguished from the other output processes, it will be described as an "output-1 process" in the following description. Outputs 2 and 3 will be described in a similar manner.

Each of the control process blocks may be connected to a plurality of inputs and a plurality of outputs. In the control process blocks to which inputs and outputs are connected, various processes are performed based on an input and an internal variable held by each of the control process blocks to produce outputs and update the internal variable based on a result of the processing.

A connection (connection line) represented by an arrow between the control process blocks represents an input and an output of data between the control process blocks. There are two ways to input data to the control process blocks. One is a trigger input for controlling at least one of start, selection, and stop of the control process blocks, and the other is a data input to be consecutively processed by the control process blocks. The former trigger input is mainly represented by inputs of 0/1 bits, and the latter data input is frequently represented by a value larger than a binary value. However, when the trigger input represents, for example, start, selection, and stop of a process, it is also represented by a value larger than a binary value. Depending on a definition, only one or both of the trigger input and the data input may be used for inputting to a control process block. Examples of the cases where both of the inputs are used include a case where the trigger input is used when the program generating apparatus obtains a discrete value smaller than or equal to a pre-parameterized value and the data input is used otherwise.

The control process blocks can be stratified, and details of each of the blocks can be described by a model described by a plurality of the blocks. Processes in the blocks can be described not in a graphical language but in a text-based procedure oriented language such as C language. Similarly, control models can be described in languages other than the graphical language. Assuming that control models described in different languages are simultaneously executed, the entire control models can be defined to a certain extent.

The input processes (for example, inputs 1 to 5 in FIG. 1) and the output processes (for example, outputs 1 to 3 in FIG. 1) in the control model can be associated, through settings, with signals of the input-output devices connected to controllers or signals for communication with a controller of another apparatus.

Figure 2:
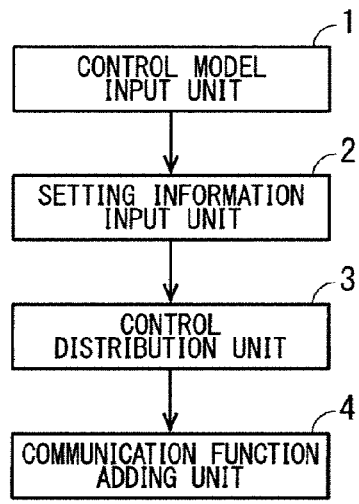
FIG. 2 is a block diagram illustrating a configuration of a program generating apparatus according to Embodiment 1.

FIG. 2 is a block diagram illustrating a configuration of the program generating apparatus according to Embodiment 1. The program generating apparatus in FIG. 2 includes a control model input unit 1, a setting information input unit 2, a control distribution unit 3, and a communication function adding unit 4. Various input devices such as a keyboard and a touch panel or software to be described later is used as examples of the control model input unit 1 and the setting information input unit 2. The control distribution unit 3 and the communication function adding unit 4 are materialized by, for example, causing a processor to execute a program, etc. stored in a memory, which will be described later.

The control model input unit 1 receives a control model (here, a control model designed by the user). In other words, the control model (here, a control model designed by the user) is input to the control model input unit 1.

Figure 3:
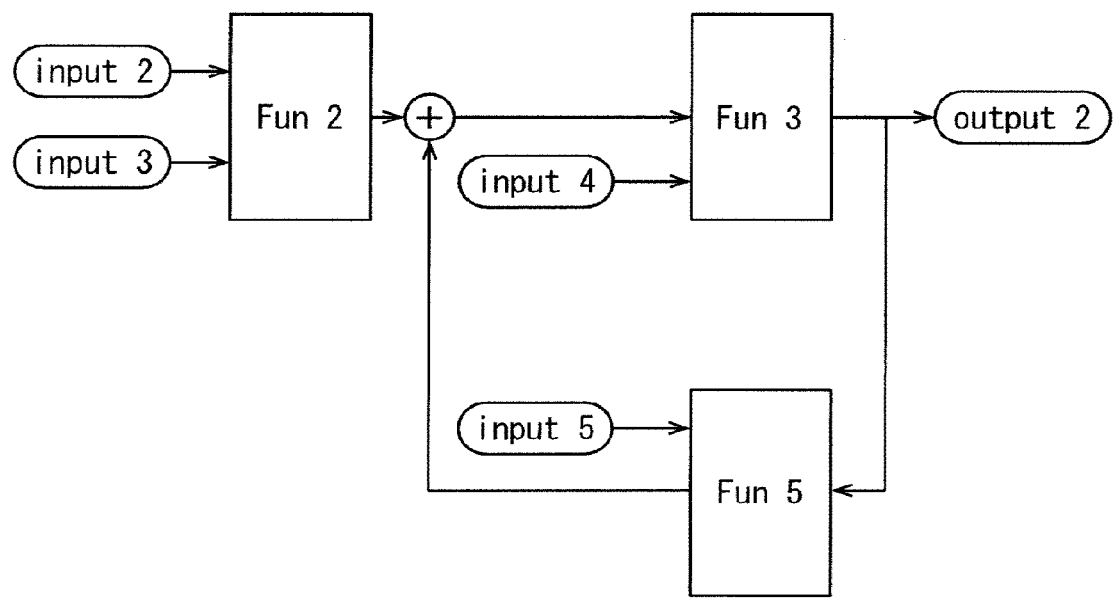
FIG. 3 illustrates an example of a control model.

First, in early stages of designing a control model, a simple control model only for operating a machine is developed in the graphical language as illustrated in FIG. 1 and a takt time, etc. is considered by controlling a mechanical model, similarly as the conventional model-based development. Since the principal purpose at this time is verification of a takt time, the control model is a simple control model including only normal machinery operations as illustrated in FIG. 3.

Figure 4:
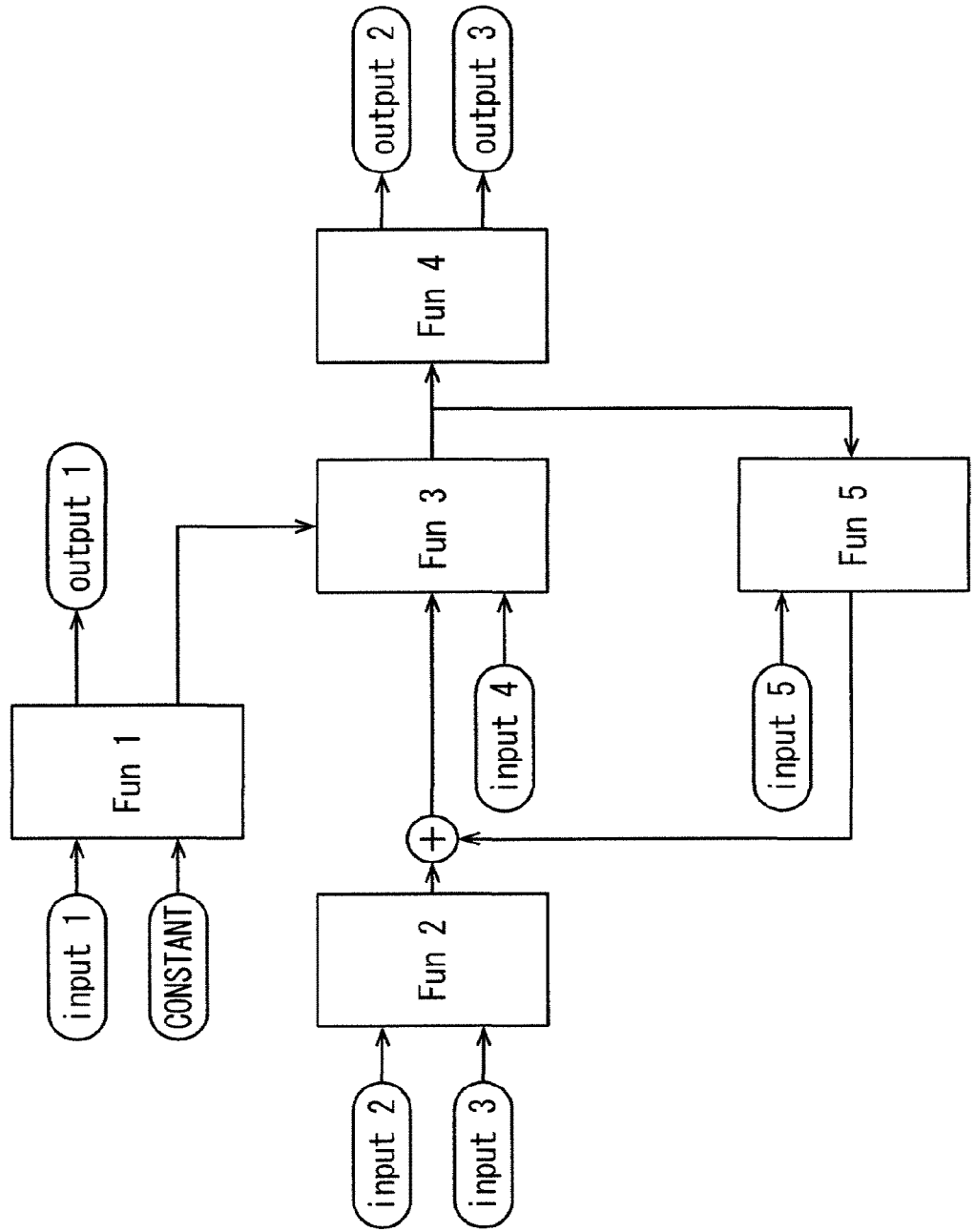
FIG. 4 illustrates an example of a control model.

After the control model expected to satisfy the target performance is developed, a control model including control of operations other than the normal machinery operations is developed as illustrated in FIG. 4. Examples of the control of operations other than the normal machinery operations include control on error operations such as return to origin of a machine and a stop operation, and various controls to be added to a production apparatus such as start of a machine, a stop operation, and input and output of various switches and a display. The control models to be input to the control model input unit 1 may not include a part or all of the various controls to be added to a production apparatus. After a control model (a plurality of control blocks) is decomposed (distributed) into the respective controllers, these controls may be individually added to the controllers. In other words, the control model in FIG. 3 or FIG. 4 may be input to the control model input unit 1.

The control model (a plurality of control blocks) input to the control model input unit 1 is decomposed (distributed) into the respective controllers, which will be described later. Thus, the control model to be input to the control model input unit 1 preferably includes control processes relevant to processes on a plurality of controllers.

The setting information input unit 2 receives setting information of a plurality of controllers, connection information between the controllers, and connection information between the controllers and input-output devices (connection information of I/Os).

The setting information of the controllers includes, for example, a control period of the controllers. Although the setting information may be setting parameters used when the controllers are actually operated, constraints may be set when the setting parameters are not certain. For example, the control period may be set to a processing period (for example, a constant period of 1 millisecond) when the controllers are actually operated as a setting parameter, may be set under a constraint that, for example, the process should be complete within 1 millisecond, or may be set without any constraint.

The connection information between the controllers includes, for example, configuration information of the controllers, information on which type of network via which the controllers are connected, and setting information for communication between the controllers.

The connection information of I/Os includes, for example, information on what kind of device is connected to which controller including communication with a controller of another apparatus, information on what kind of data is communicated between the device and the controller, and information on with which internal variable the data is processed in the controller.

Figure 5:
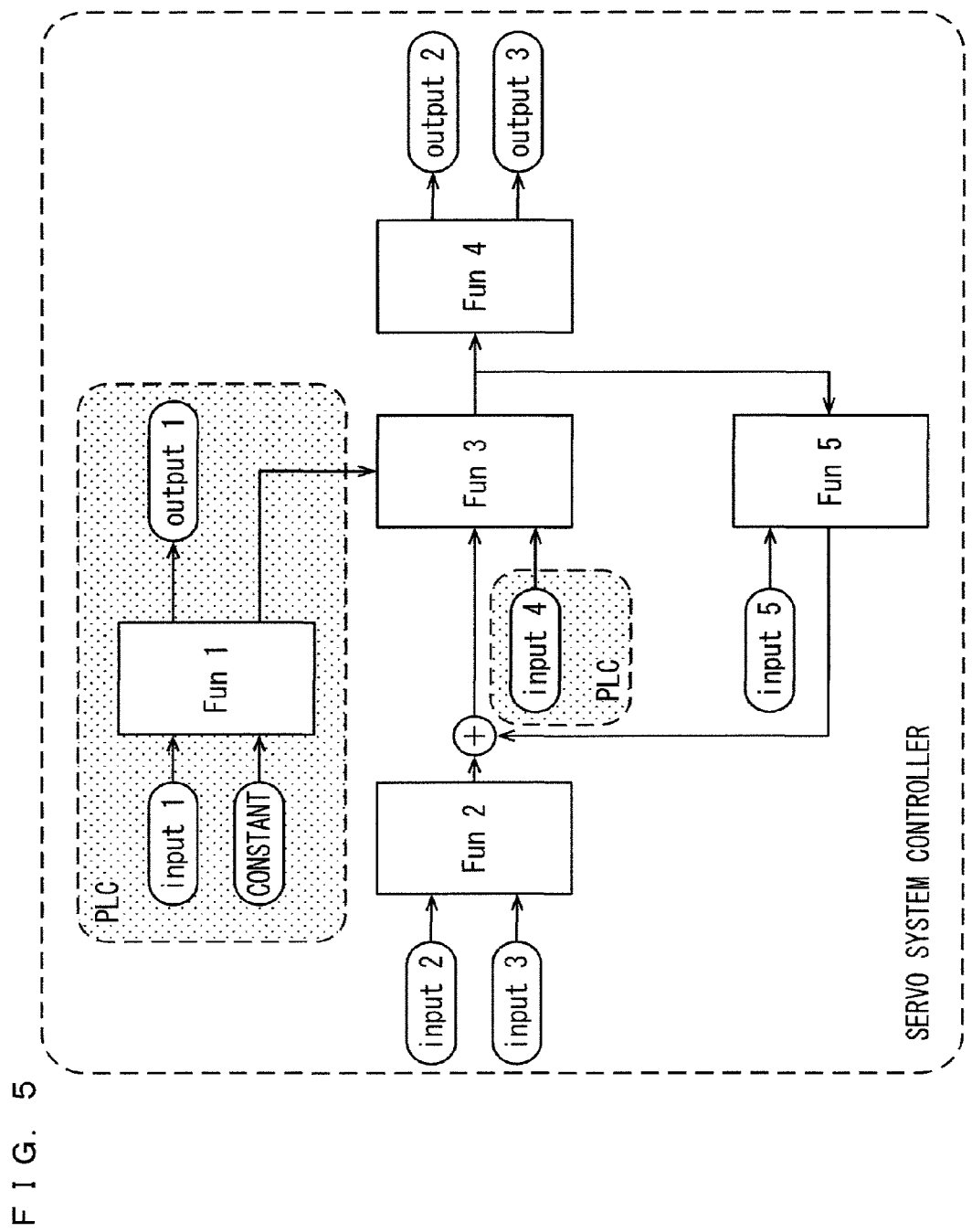
FIG. 5 illustrates an example result of processing performed by a control distribution unit according to Embodiment 1.

The control distribution unit 3 allocates the control blocks of the control model to the respective controllers, based on the control model received by the control model input unit 1, and the setting information and the connection information received by the setting information input unit 2. FIG. 5 illustrates an example result of allocation (distribution) of the control model in FIG. 4 to the respective controllers by the control distribution unit 3.

In the example of FIG. 5, a control process block Fun 1, a constant connected to the control process block Fun 1, the input-1 process, the output-1 process, and an input-4 process are allocated to a PLC, whereas the other processes are allocated to a servo system controller. Although the control blocks of the control model are allocated to two kinds of controllers, namely, the PLC and the servo system controller in the following description, obviously, the kinds of the controllers are not limited to these.

Figure 6:
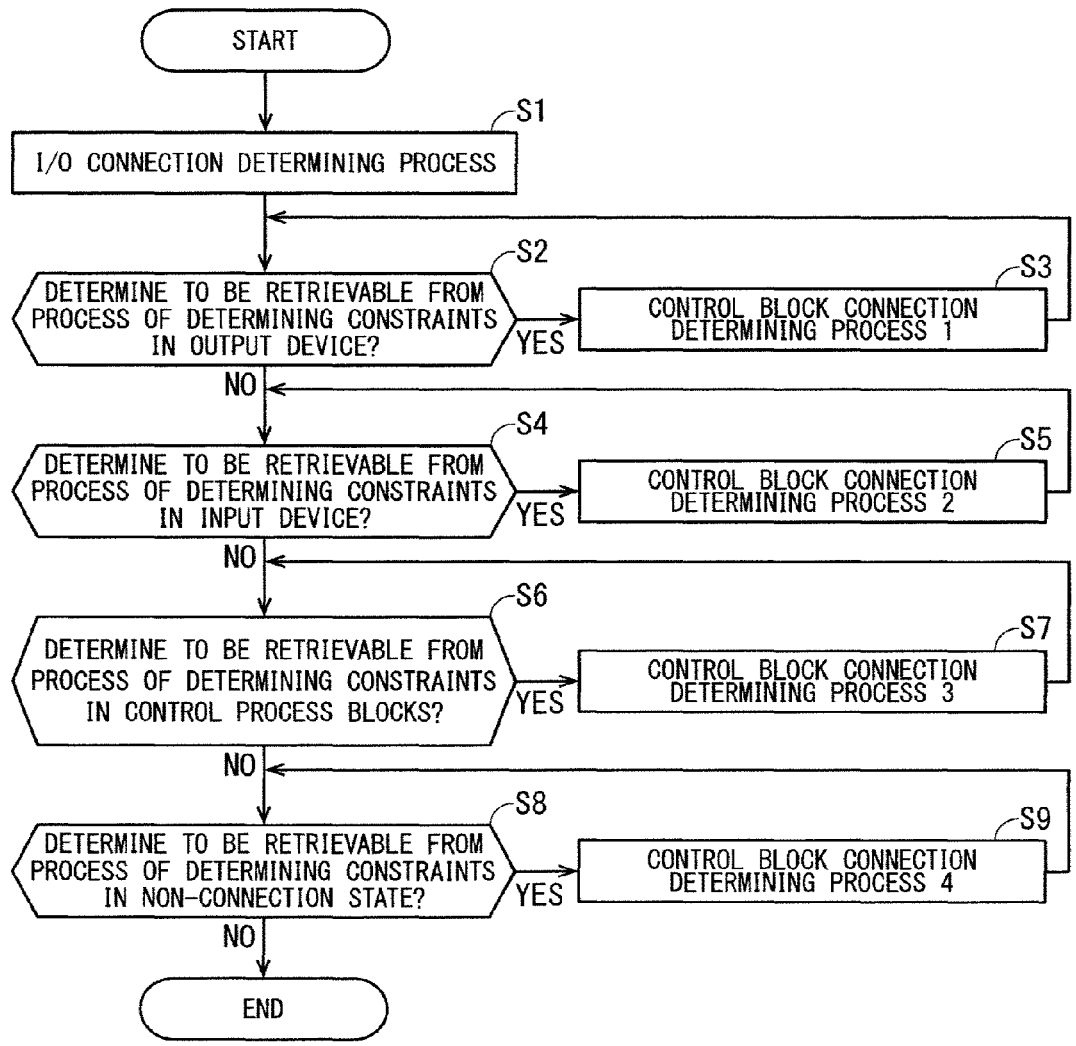
FIG. 6 is a flowchart illustrating allocation processes of the control distribution unit according to Embodiment 1.

FIG. 6 is a flowchart illustrating the allocation processes of the control distribution unit 3 according to Embodiment 1.

In Step S1, first, the control distribution unit 3 performs an I/O connection determining process. Specifically, the control distribution unit 3 retrieves, from the connection information of I/Os received by the setting information input unit 2, input processes and output processes which are connected to an input-output device among input processes and output processes of the control model received by the control model input unit 1. Then, the control distribution unit 3 allocates the retrieved input processes and output processes to controllers connected to the input-output device indicated by the connection information of I/Os. In the example of FIG. 5, this Step S1 allocates the input-1 process, the input-4 process, and the output-1 process to the PLC, and the other input processes and output processes to the servo system controller.

In Step S2, the control distribution unit 3 performs a process of determining constraints in an output device. Specifically, the control distribution unit 3 determines whether a controller whose constraints of the control processes are the most stringent can be retrieved from among the controllers (the PLC and the servo system controller in the example of FIG. 5) to which the output processes are allocated in Step S1. Here, the control distribution unit 3 determines the constraints as stringent when, for example, the control period is the shortest in the setting information or the constraints of the controllers that is input by the setting information input unit 2 or when there is no margin in capacity for the control processes due to allocation of many other control processes (for example, the allocated control process load is higher than or equal to a threshold). The control distribution unit 3 may determine whether the constraints are stringent, based on one or more factors. This result shows that the controller whose constraints of the control processes are the most stringent is a controller having fewer control processes that can be additionally allocated.

If it is determined in Step S2 that the controller can be retrieved, the processes proceed to Step S3 (a control block connection determining process 1). If not, the processes proceed to Step S4 (a process of determining constraints in an input device).

In Step S3, the control distribution unit 3 performs the control block connection determining process 1. Specifically, the control distribution unit 3 allocates the control process blocks connected to the output processes allocated to the controller retrieved in Step S2, to the controller retrieved in Step S2. This allocation is not performed when the control process blocks already have allocation destinations. Then, the control distribution unit 3 allocates, among the control process blocks newly allocated to the controllers, a control process block which is connected to a data input side and whose allocation destination has not been determined yet to the controller retrieved in Step S2.

Figure 7:
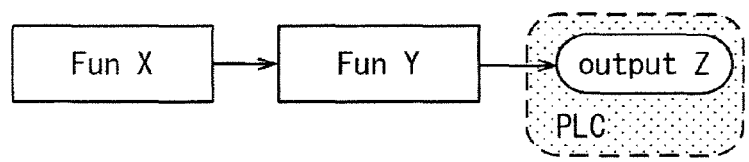
FIG. 7 illustrates an example process of the control distribution unit according to Embodiment 1.

FIG. 7 illustrates an example process of the control distribution unit 3 in Step S3. In the example of FIG. 7, a control process block Fun X is connected closer to the data input side with respect to a control process block Fun Y, and the control process block Fun Y is connected to an output-Z process. Although this output-Z process is already allocated to a controller referred to as a PLC, neither the control process block Fun X nor the control process block Fun Y has not been yet allocated to any controller.

In Step S3, the control distribution unit 3 allocates the control process block Fun Y to the controller (PLC) of the output-Z process. Then, the control distribution unit 3 allocates the control process block Fun X to the controller (PLC) of the control process block Fun Y.

The control distribution unit 3 recursively repeats the allocation starting from the control process block newly allocated as described above. Then, if the control process block cannot be newly allocated to any controller, Step S3 ends, and the processes return to Step S2.

If the processes return from Step S3 to Step S2, the control distribution unit 3 determines whether a controller whose constraints of the control processes are the second stringent next to the controller retrieved in the previous Step S2 can be retrieved from among the controllers to which the output processes are allocated in Step S1. If it is determined that the controller can be retrieved, the processes proceed to Step S3 (the control block connection determining process 1). If not, the processes proceed to Step S4 (the process of determining constraints in the input device). Assumed cases where it is determined that the controller cannot be retrieved include a case where all the output processes are allocated to the controllers.

In Step S4, the control distribution unit 3 performs a process of determining constraints in the input device. Specifically, the control distribution unit 3 determines whether a controller whose constraints of the control processes are the most stringent can be retrieved from among the controllers to which the input processes are allocated in Step S1. Although whether the constraints are stringent is determined similarly as in Step S2 (the process of determining constraints in the output device), it may not be determined completely in the same manner as Step S2.

If it is determined in Step S4 that the controller can be retrieved, the processes proceed to Step S5 (a control block connection determining process 2). If not, the processes proceed to Step S6 (a process of determining constraints in the control process blocks).

In Step S5, the control distribution unit 3 performs the control block connection determining process 2. Specifically, the control distribution unit 3 allocates a control process block connected to an input process allocated to the controller retrieved in Step S4, to the controller retrieved in Step S4. This allocation is not performed when the control process block already has an allocation destination. Then, the control distribution unit 3 allocates, among the control process blocks newly allocated to the controller, a control process block which is connected to a data output side and whose allocation destination has not been determined yet to the controller retrieved in Step S4. The control distribution unit 3 recursively repeats the allocation starting from the control process block newly allocated as described above. Then, if the control process block cannot be newly allocated to any controller, Step S5 ends, and the processes return to Step S4.

If the processes return from Step 5 to Step S4, the control distribution unit 3 determines whether a controller whose constraints of the control processes are the second stringent next to the controller retrieved in the previous Step S4 can be retrieved from among the controllers to which the input processes are allocated in Step S1. If it is determined that the controller can be retrieved, the processes proceed to Step S5 (the control block connection determining process 2). If not, the processes proceed to Step S6 (the process of determining constraints in the control process blocks). Assumed cases where it is determined that the controller cannot be retrieved include a case where all the input processes are allocated to the controllers.

In Step S6, the control distribution unit 3 performs a process of determining constraints in the control process blocks. Specifically, the control distribution unit 3 determines whether a control process block connected to another control process block that is not allocated to a controller can be retrieved from among the control process blocks that have already been allocated to the controllers.

If it is determined in Step S6 that the control process block can be retrieved, a control process block allocated to the controller whose constraint is the most stringent is retrieved from the retrieved control process blocks, and then the processes proceed to Step S7 (a control block connection determining process 3). If it is determined in Step S6 that the control process block cannot be retrieved, the processes proceed to Step S8 (a process of determining constraints in a non-connection state).

In Step S7, the control distribution unit 3 performs the control block connection determining process 3. Specifically, the control distribution unit 3 allocates another control process block connected to the control process block retrieved in Step S6, to a controller of the control process block retrieved in Step S6. This allocation is not performed when the other control process block already has an allocation destination. Then, the control distribution unit 3 allocates, among different control process blocks connected to the other control process blocks newly allocated to the controller, a control process block whose allocation destination has not been determined yet to the controller of the control process block retrieved in Step S6.

Figure 8A:
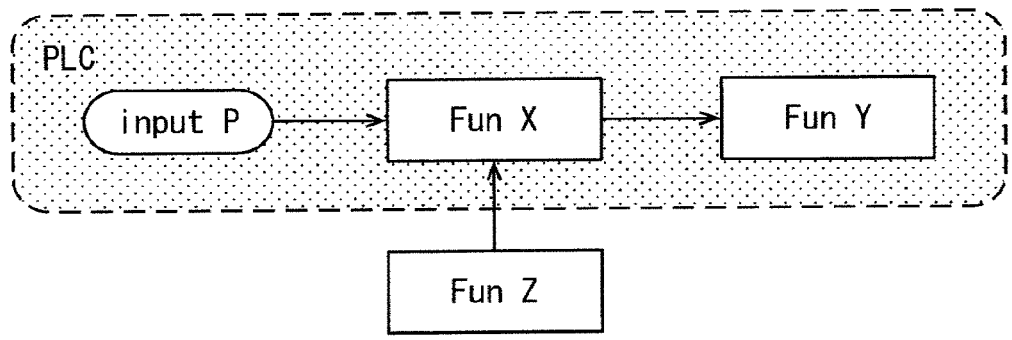
FIGS. 8A and 8B illustrate example processes of the control distribution unit according to Embodiment 1.
Figure 8B:
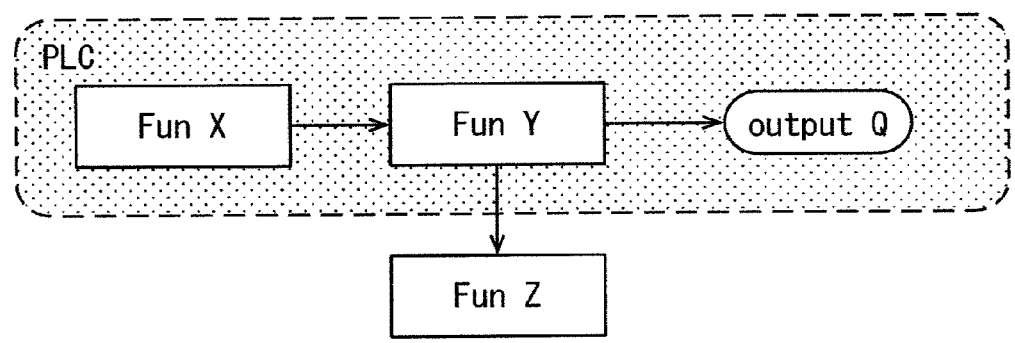

Each of FIGS. 8A and 8B illustrates an example process of the control distribution unit 3 in Step S7. In the example of FIG. 8A, an input-P process and a control process block Fun Z are connected to a control process block Fun X, and the control process block Fun X is connected to a control process block Fun Y. Although the blocks other than the control process block Fun Z have already been allocated to a controller referred to as a PLC, the control process block Fun Z has not yet been allocated to any controller.

Here, the control distribution unit 3 allocates the control process block Fun Z to the controller (PLC) of the control process block Fun X in Step S7. Although the process in (FIG. 8A is similar to the control block connection determining process 1 in Step S3, they differ from each other in that the control block connection determining process 1 is performed from the output process toward the data input side, whereas the process in FIG. 8A is performed from the control process block toward both the data input side and the data output side.

In the example of FIG. 8B, the control process block Fun X is connected to the control process block Fun Y, whereas the control process block Fun Y is connected to the control process block Fun Z and an output-Q process. Although the blocks other than the control process block Fun Z have already been allocated to a controller referred to as a PLC, the control process block Fun Z has not yet been allocated to any controller.

Here, the control distribution unit 3 allocates the control process block Fun Z to the controller (PLC) of the control process block Fun Y in Step S7. Although the process in FIG. 8B is similar to the control block connection determining process 2 in Step S5, they differ from each other in that the control block connection determining process 2 is performed from the input process toward the data output side, whereas the process in FIG. 8B is performed from the control process block toward both the data input side and the data output side.

The control distribution unit 3 recursively repeats the allocation starting from the control process block newly allocated as described above. Then, if the control process block cannot be newly allocated to any controller, Step S7 ends, and the processes return to Step S6.

If the processes return from Step S7 to Step S6, the control distribution unit 3 determines whether a control process block connected to another control process block that is not allocated to any controller can be retrieved from among the controllers to which the controllers have already been allocated as described above. If it is determined that the control process block can be retrieved, a control process block allocated to the controller whose constraint is the most stringent is retrieved from among the control process blocks, and then the processes proceed to Step S7 (the control block connection determining process 3). If it is determined in Step S6 that the control process block cannot be retrieved, the processes proceed to Step S8 (a process of determining constraints in a non-connection state).

In Step S8, the control distribution unit 3 performs a process of determining constraints in a non-connection state. Specifically, the control distribution unit 3 determines whether one of the control process blocks that have not yet been allocated to any controller can be retrieved based on an appropriate criterion for judgment. Here, a relatively high rank of the processing load in the control process block, the number of global variables to be processed within the control process block being ranked as large, or the order of identification numbers simply allocated to the control process blocks are used as examples of the appropriate criterion for judgment. The control distribution unit 3 may determine the appropriate criterion for judgment under a single condition or a combination of a plurality of conditions. The global variables are typically variables that enable access from any part which is not connected to the control process block in a control model to the control process block, and include a variable whose accessible range is limited.

If it is determined in Step S8 that the control process block cannot be retrieved, the processes in FIG. 6 end.

If it is determined in Step S8 that the control process block can be retrieved, the control distribution unit 3 retrieves a controller to which the retrieved control process block is to be allocated, based on the appropriate criterion for judgment. Here, the criteria of being a controller whose constraint is the most mild and being a controller to which many other control process blocks referring to the global variables used in the retrieved control process block are allocated are used as examples of the appropriate criterion for judgment. The control distribution unit 3 may determine the appropriate criterion for judgment under a single condition or a combination of a plurality of conditions. Then, the processes proceed to Step S9 (a control block connection determining process 4). When the process in Step S8 proceeds to Step S9, the control process block and the controller are retrieved.

In Step S9, the control distribution unit 3 performs the control block connection determining process 4. Specifically, the control distribution unit 3 allocates the control process block retrieved in Step S8 to the controller retrieved in Step S8. Then, the control distribution unit 3 allocates, among different control process blocks connected to the control process block newly allocated to the controller, a control process block whose allocation destination has not been determined yet to the controller retrieved in Step S8. The control distribution unit 3 recursively repeats the allocation starting from the control process block newly allocated as described above. Then, if the control process block cannot be newly allocated to any controller, Step S9 ends, and the processes return to Step S8.

Through a series of the processes, the control distribution unit 3 distributes (allocates) all the control process blocks within the control model to the controllers.

When the first and second control blocks allocated to different controllers are connected to each other in the allocated control model, the communication function adding unit 4 in FIG. 2 adds a communication control block to the connected part (connection line) between the first and second control blocks.

Figure 9:
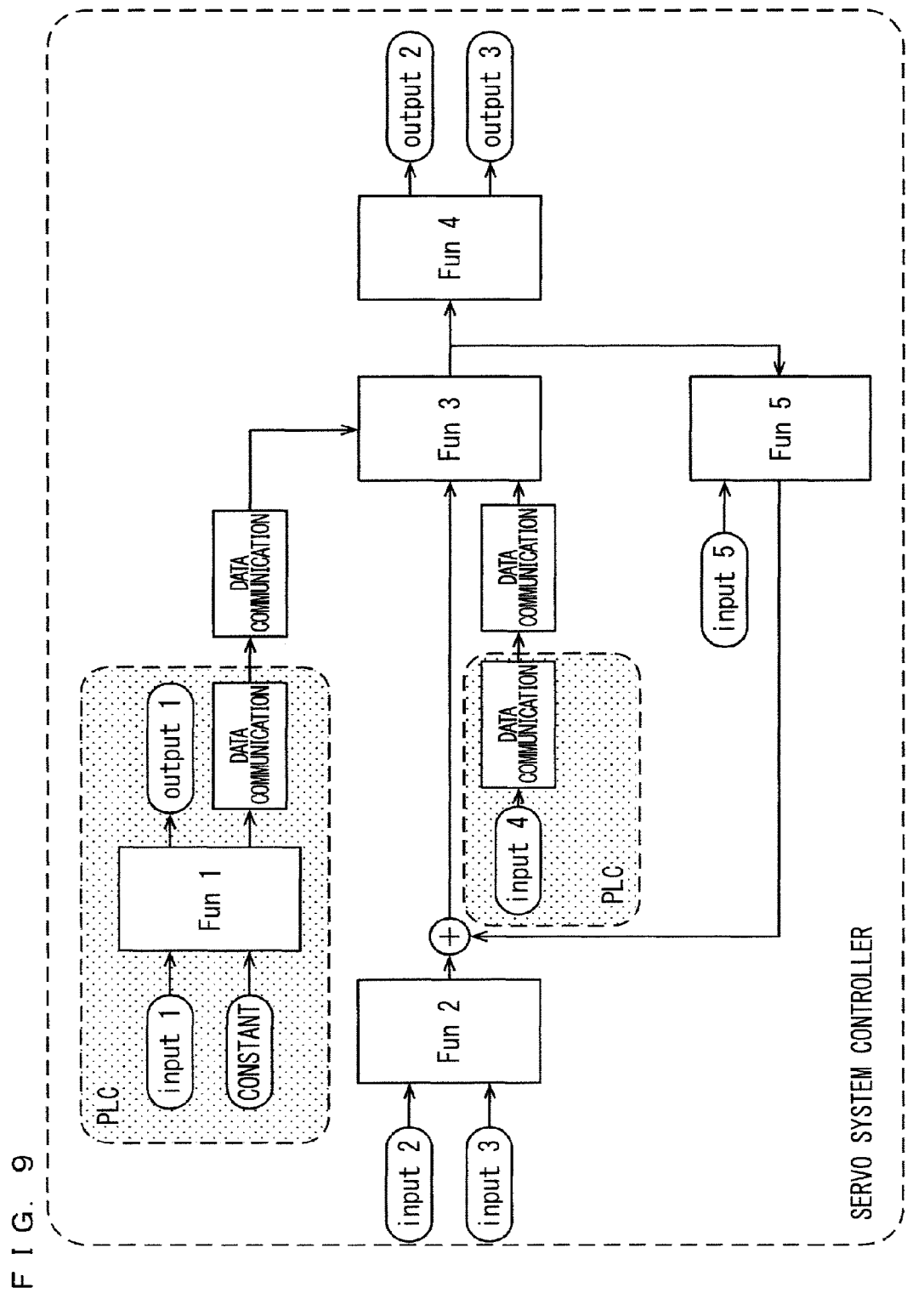
FIG. 9 illustrates an example result of processing performed by a communication function adding unit according to Embodiment 1.

FIG. 9 illustrates an example result of the process performed by the communication function adding unit 4 on the control model allocated as illustrated in FIG. 5. As illustrated in FIG. 9, the communication function adding unit 4 adds data communication processes that are communication control blocks between the control process block Fun 3 allocated to the servo system controller and each of the control process block Fun 1 and the input-4 process that are allocated to the PLC.

The data communication processes include various processes for data communication between different controllers, such as a process of allocating an internal variable of each controller to an internal variable for communication. Here, the communication function adding unit 4 may allocate an internal variable for communication based on the connection information of the controller received by the setting information input unit 2.

Through these processes, all the control blocks in the control model are allocated to the controllers, and a control model (for example, the control model as illustrated in FIG. 9) is obtained in which the communication control blocks are disposed in the connected part between the control blocks allocated to the different controllers.

Then, the user such as the operator translates the control block allocated to each controller into a program for each of the controllers, using a known technique for translating a control model into a program that can be processed even by a factory automation controller. As described above, the control program for each of the controllers can be generated from the control model that has been input by the user and disregards the constraints of the controllers, the setting information of the controllers that is the constraints of the controllers, and the connection information between the controllers and the I/Os.

Summary of Embodiment 1

With the program generating apparatus according to Embodiment 1, the respective control blocks of the control model are allocated to the controllers, based on the control model received by the control model input unit 1, and the setting information and the connection information received by the setting information input unit 2. When first and second ones of the control blocks are connected to each other, a communication control block is added to a connected part between the first and second control blocks, the first and second control blocks being allocated to different ones of the controllers in the allocated control model. Accordingly, a control model that is translatable into a program for each of the controllers can be almost automatically generated from the control model that disregards the constraints of the controllers. As a result of this, the operations of the user who understands the specifications of the controllers and develops a program can be reduced.

The processes of the control distribution unit 3 described in Embodiment 1, for example, the conditions or the orders of the determining processes are examples, and are not limited. Furthermore, Embodiment 1 does not restrict the user from adjusting the control model after the processes of the control distribution unit 3 and the communication function adding unit 4.

Although the allocation process to the controllers is recursively performed so long as there are control process blocks newly allocated to the controllers in the control block connection determining processes 1, 2, 3, and 4 of Embodiment 1, the allocation process may be moved to each of the processes of determining constraints in midstream.

Furthermore, a controller may be retrieved by determining the stringency of the constraints of each controller again in each of the processes of determining constraints. Furthermore, in each of the processes of determining constraints, a process of prohibiting allocation to the controllers or cancelling the prohibiting process may be performed according to a result of the determination on the stringency of the constraints.

Embodiment 2

The block configuration of a program generating apparatus according to Embodiment 2 of the present invention is the same as that (FIG. 2) according to Embodiment 1. In the program generating apparatus according to Embodiment 2 hereinafter, the same or similar constituent elements as those according to Embodiment 1 will be denoted by the same reference numerals, and the different constituent elements will be mainly described.

According to Embodiment 1, the control distribution unit 3 does not change allocation of the control model (control blocks) to the controllers. However, after all the control blocks within the control model are allocated to the controllers, if any one of the controllers does not satisfy the constraints such as a control period, the allocation is preferably reviewed and changed.

According to Embodiment 2 herein, the setting information includes a constraint to be satisfied by the plurality of controllers. When the control model in which the controllers are allocated does not satisfy the constraint included in the setting information received by the setting information input unit 2, the control allocation unit 3 changes allocation of the control blocks in the control model. Specifically, the control distribution unit 3 recursively cancels the allocation of the control blocks to the controllers, and recursively allocates the control blocks to the recursively optimal controllers in view of the whole control model.

Figure 10:
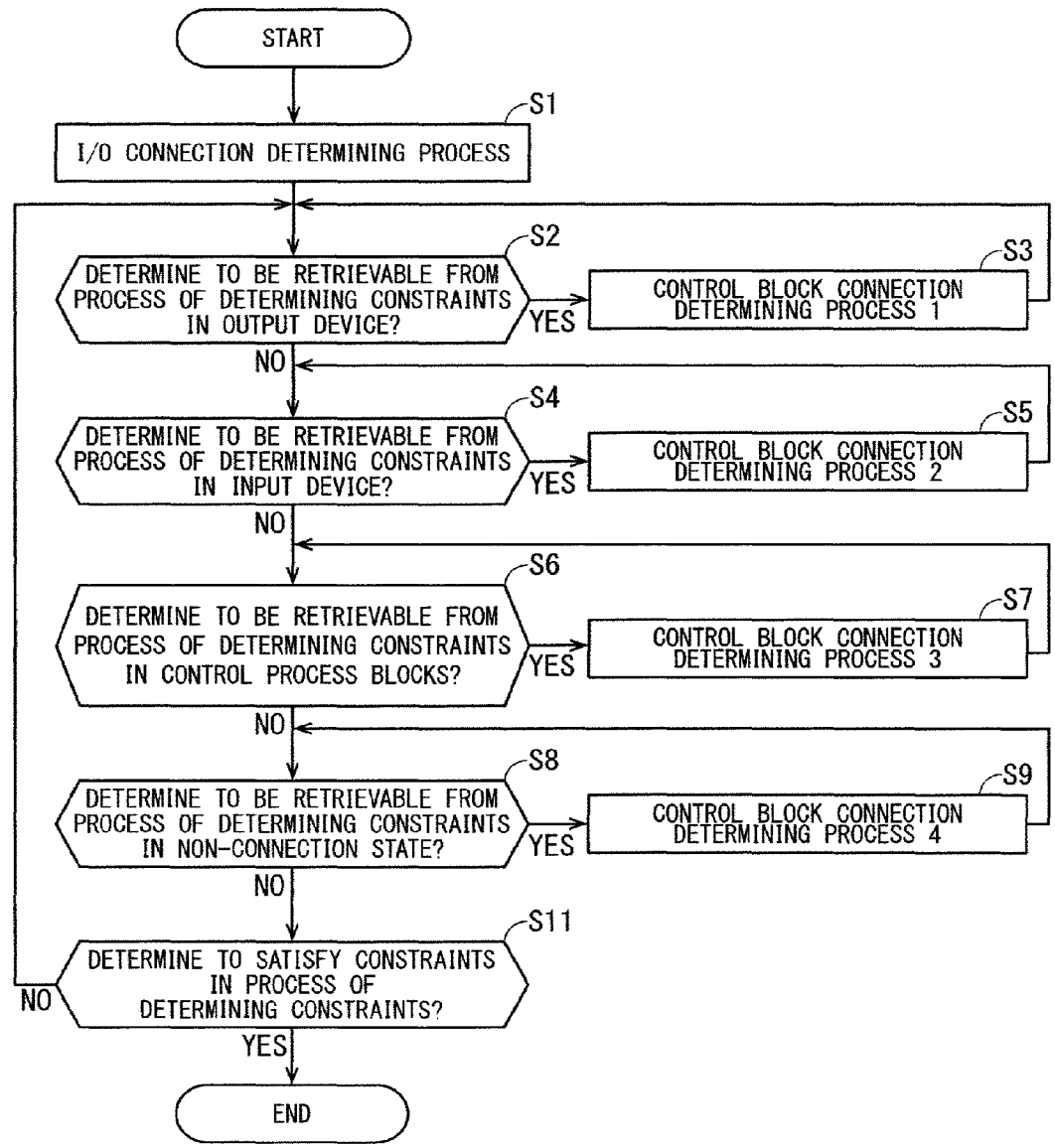
FIG. 10 is a flowchart illustrating allocation processes of a control distribution unit according to Embodiment 2.

FIG. 10 is a flowchart illustrating the allocation processes of the control distribution unit 3 according to Embodiment 2. In FIG. 10, the same processes as those in FIG. 6 will be denoted by the same reference numerals, and the differences will be mainly described.

As illustrated in FIG. 10, a constraint determining process is added as Step S11 after Step S9 in FIG. 6 to the processes of the control distribution unit 3 according to Embodiment 2.

In Step S11 (the constraint determining process), the control distribution unit 3 determines whether the result of allocation of the control blocks to the respective controllers satisfies the constraints of the controllers in the setting information of the controllers that is input by the setting information input unit 2. For example, whether the control period that is a constraint is satisfied is determined when the control blocks allocated to the controllers are processed.

If it is determined in Step S11 that all the constraints are satisfied, the control distribution unit 3 ends Step S11 and also the processes in FIG. 10. If it is not determined in Step S11 that all the constraints are satisfied, the control distribution unit 3 cancels the allocation of the control block to the controller that does not satisfy the constraints. In the example of FIG. 10, the processes return to Step S2 after cancellation of the allocation. However, in reallocation processes after the cancellation, an allocation process is performed while the canceled control block is prohibited from being allocated to the same controller before the cancellation (hereinafter referred to as an "allocation process with prohibition").

When even a predetermined number of recursive searches fail to achieve the allocation that satisfies all the constraints, which is not illustrated, the user may be notified of an error message indicating that the constraints are not satisfied, and the processes in FIG. 10 may end.

Although the example of cancelling the allocation to the controller is described with reference to FIG. 10, the cancellation of allocation to the controller is not limited to this but may be performed, for example, in an order reverse to the allocated order. Specifically, if it is not determined in Step S11 that all the constraints are satisfied, the control distribution unit 3 cancels the allocation of all the control blocks performed in Step S9 (the control block connection determining process 4), and performs the allocation process with prohibition (for example, again Step S9). Then, Step S11 is performed similarly as above. If it is not determined that all the constraints are satisfied through performing again Steps S9 and S11 a predetermined number of times, the allocation of all the control blocks performed in Step S7 (the control block connection determining process 3) is canceled, and the allocation process with prohibition (for example, again Step S7) is performed. Unless it is determined in Step S11 that all the constraints are satisfied, the cancellation of the allocation and the allocation process with prohibition are performed in a reverse chronological order from Step S5 to Step S3.

Otherwise, connection via the trigger input may be cancelled more preferentially than connection via the data input. This is because in many cases, the trigger input notifies a discrete event and allocating the trigger input to the other controllers poses no problem. In the description above, the control distribution unit 3 cancels allocation of "all the control blocks" performed in the respective control block connection determining processes 1, 2, 3, and 4. However, the processes are not limited to such, but allocation of the control blocks may be cancelled in an order reverse to the allocated order and the allocation process with prohibition may be performed in each of the control block connection determining processes.

Summary of Embodiment 2

In the program generating apparatus according to Embodiment 2, allocation of the control blocks are changed when the control model in which the controllers are allocated does not satisfy the constraint included in the setting information received by the setting information input unit 2. Thus, the optimal allocation for satisfying the constraints can be recursively searched.

Embodiment 3

The block configuration of a program generating apparatus according to Embodiment 3 of the present invention is the same as that (FIG. 2) according to Embodiment 1. In the program generating apparatus according to Embodiment 3 hereinafter, the same or similar constituent elements as those according to Embodiment 1 will be denoted by the same reference numerals, and the different constituent elements will be mainly described.

In Embodiment 3, the data communication processing (communication control blocks) illustrated in FIG. 9 includes a function of performing data processing on communication data output from one of the first and second control blocks and of inputting the communication data to the other of the first and second control blocks, the data processing being relevant to a control period (communication synchronization). Then, the communication function adding unit 4 determines the data processing to be performed in the data communication processing (communication control block), based on the control model received by the control model input unit 1 and the setting information received by the setting information input unit 2.

For example, when control periods of controllers are different, the communication function adding unit 4 adds data processing to data communication processing, for example, to prevent a failure of transmitting and receiving communication data or to improve the control performance using the communication data.

An example of determining the data processing performed by the communication function adding unit 4 on a long-period controller A whose control period is long and a short-period controller B whose control period is short will be hereinafter described. When the short-period controller B transmits pulse data to the long-period controller A, the communication function adding unit 4 determines a process of holding the communication data from the short-period controller B until the long-period controller A receives the pulse data to prevent a failure of transmitting and receiving the communication data, as the data processing to be performed in the data communication processing. Conversely, when the short-period controller B receives pulse data from the long-period controller A, the communication function adding unit 4 determines a process of pulsing the communication data from the long-period controller A as the data processing to be performed in the data communication processing. Furthermore, when the short-period controller B is required to process the communication data from the long-period controller A as an amount of continuous variation, the communication function adding unit 4 determines a process of interpolating the communication data from the long-period controller A as the data processing to be performed in the data communication processing.

As described above, the communication function adding unit 4 determines which type of data processing is performed in the data communication processing (a communication control block) based on setting conditions on the controllers and the type of input and output data of the control block to be connected to the data communication processing.

Summary of Embodiment 3

The program generating apparatus according to Embodiment 3 determines the data processing to be performed in the data communication processing (a communication control block), based on the control model received by the control model input unit 1 and the setting information received by the setting information input unit 2. Accordingly, the user operations of adding a program for communication can be reduced.

Embodiment 4

The block configuration of a program generating apparatus according to Embodiment 4 of the present invention is the same as that (FIG. 2) according to Embodiment 1. In the program generating apparatus according to Embodiment 4 hereinafter, the same or similar constituent elements as those according to Embodiment 1 will be denoted by the same reference numerals, and the different constituent elements will be mainly described.

Data communication between control blocks is normally programmed on a connection between control blocks in a control model. However, the programming is sometimes performed by defining a global variable for the whole control model and accessing the global variable to enable communication between the control blocks. Since the global variable is accessed in a process in a control block or in a process described in another program language, it is not represented as connection information of the control block.

The program generating apparatus according to Embodiment 4 can generate a program even in such a case. Specifically, the control model includes: a third one of the control blocks; and a fourth one of the control blocks capable of transmitting and receiving data to and from the third control block using a global variable, the fourth control block being not connected to the third control block. When among the controllers in the control model as illustrated in FIG. 9, controllers to which the third and fourth control blocks are allocated are different from each other, the communication function adding unit 4 adds data communication processing to be performed between the controllers to which the third and fourth control blocks are allocated.

More specifically, the communication function adding unit 4 retrieves global variables in the control blocks allocated to the respective controllers, and determines the presence of a plurality of control blocks whose global variables are the same and accessible to each other but whose controllers are different. When the communication function adding unit 4 determines the presence of such control blocks, the communication function adding unit 4 adds a communication program (data communication processing) between the controllers based on the connection information of the controllers. This communication program may be added as an independent control block that is not connected to the other control blocks, may be added by a program other than a program language for connecting the control blocks, or may be added as a parameter setting of the controllers. The communication program is not limited by these methods.

Summary of Embodiment 4

With the program generating apparatus according to Embodiment 4, in the case where the third and fourth control blocks are capable of transmitting and receiving data therebetween using a global variable but are not connected to each other in the control model, when controllers to which the third and fourth control blocks are allocated are different from each other, data communication processing to be performed between the controllers to which the third and fourth control blocks are allocated is added. Accordingly, the user operations of adding a program for communication can be reduced.

Embodiment 5

Figure 11:
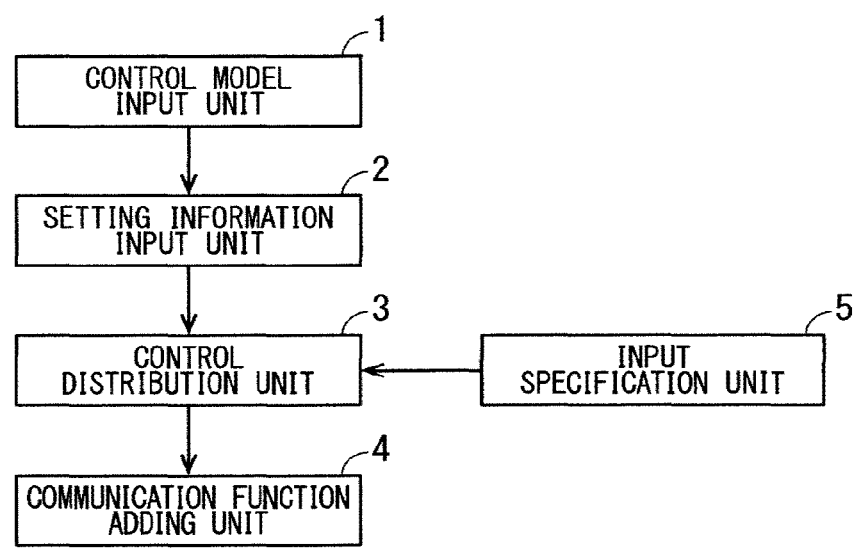
FIG. 11 is a block diagram illustrating a configuration of a program generating apparatus according to Embodiment 5.

FIG. 11 is a block diagram illustrating a configuration of a program generating apparatus according to Embodiment 5 of the present invention. The program generating apparatus in FIG. 11 includes an input specification unit 5, in addition to the program generating apparatus (FIG. 2) according to Embodiment 1. The input specification unit 5 can specify, through an external input (a user input), a controller to which a control block of a control model is to be allocated. Various input devices such as a keyboard and a touch panel or software to be described later is used as an example of the input specification unit 5.

If there is a control block to which the user intends to specify a controller to be allocated, the user specifies the control block on the control model, using the input specification unit 5. This specifying process may be performed on a control model that is to be input to the control distribution unit 3. This specifying process may be performed by manually reallocating a control model to a controller based on a result of the output from the control distribution unit 3. Furthermore, the control model manually reallocated may be again input to the control distribution unit 3.

Summary of Embodiment 5

Since the program generating apparatus according to Embodiment 5 has a function of enabling the user to manually specify a controller to which a control block is to be allocated, the user can perform detailed design.

Others

Figure 12:
FIG. 12 is a block diagram illustrating a hardware configuration of a program generating apparatus.

The respective functions of the control model input unit 1, the setting information input unit 2, the control distribution unit 3, and the communication function adding unit 4 in the program generating apparatuses described above can be implemented by a processing circuit. In other words, the program generating apparatus includes a processing circuit for: receiving a control model represented by connecting a plurality of control blocks on a control target apparatus, the control model being translatable into a program; receiving setting information of a plurality of controllers, and connection information between the controllers and between the controllers and input-output devices; allocating the respective control blocks of the control model to the controllers based on the control model, the setting information, and the connection information that are received; and adding, when first and second ones of the control blocks are connected to each other, a communication control block to a connected part between the first and second control blocks, the first and second control blocks being allocated to different ones of the controllers in the allocated control model. The processing circuit is a processor 91 that executes a program stored in a memory as illustrated in FIG. 12. This processor 91 includes a central processing unit (CPU), a central processor, a processing unit, an arithmetic unit, a microprocessor, a microcomputer, a processor, and a DSP.

The functions of the control model input unit 1, the setting information input unit 2, the control distribution unit 3, and the communication function adding unit 4 are implemented by software, firmware, or a combination of the software and the firmware. The software and the firmware are described as programs, and stored in a memory 92 as illustrated in FIG. 12. The processing circuit performs the functions in each of the units by reading and executing the programs stored in the memory. In other words, the program generating apparatus includes a memory for storing a program when executed by the processing circuit, to consequently execute the following steps: receiving a control model represented by connecting a plurality of control blocks on the control target apparatus, the control model being translatable into a program; receiving setting information of the plurality of controllers, and connection information between the controllers and between the controllers and the input-output devices; allocating the respective control blocks of the control model to the controllers based on the control model, the setting information, and the connection information that are received; and adding, when first and second ones of the control blocks are connected to each other, a communication control block to a connected part between the first and second control blocks, the first and second control blocks being allocated to different ones of the controllers in the allocated control model. In other words, these programs cause a computer to execute procedures or methods of the control model input unit 1, the setting information input unit 2, the control distribution unit 3, and the communication function adding unit 4. Here, examples of the memory include a non-volatile or volatile semiconductor memory such as a RAM, a ROM, a flash memory, an EPROM, or an EEPROM, a magnetic disc, a flexible disk, an optical disk, a compact disk, a mini disk, and a DVD. The input specification unit 5 described in Embodiment 5 has the same structure as, for example, that of the control model input unit 1.

Embodiments of the present invention can be freely combined, and appropriately modified or omitted within the scope of the present invention.

Although this invention has been described in detail, the description is in all aspects illustrative and does not restrict the invention. Therefore, numerous modifications that have yet been exemplified will be devised without departing from the scope of this invention.

EXPLANATION OF REFERENCE SIGNS

1 control model input unit, 2 setting information input unit, 3 control distribution unit, 4 communication function adding unit, 5 input specification unit.

The invention claimed is:

1. A program generating apparatus that generates a program for controlling a control target apparatus including a plurality of controllers and input-output devices connected to said respective controllers, said program generating apparatus comprising:
 a processor to execute a program; and
 a memory to store said program which, when executed by said processor, performs processes of:
 performing a control model receiving process that receives a control model represented by connecting a plurality of control blocks on said control target apparatus, said control model being translatable into said program;
 performing a setting information receiving process that receives setting information of said plurality of controllers, and connection information between said controllers and between said controllers and said input-output devices;
 performing a control distribution process that allocates said respective control blocks of said control model to said controllers, based on said control model received in said control model receiving process, and said setting information and said connection information received in said setting information receiving process; and
 performing a communication function adding process that adds, when first and second ones of said control blocks are connected to each other, a communication control block to a connected part between said first and second control blocks, and that determines data processing to be performed by said communication control block, based on said control model received in said control model receiving process and said setting information received in said setting information receiving process, said first and second control blocks being allocated to different ones of said controllers in said allocated control model, said communication control block including a function of performing said data processing on communication data output from one of said first and second control blocks and of inputting said communication data to the other of said first and second control blocks, said data processing being relevant to a control period.

2. The program generating apparatus according to claim 1, wherein said setting information includes a constraint to be satisfied by said plurality of controllers, and said control distribution process changes allocation of said control blocks in said allocated control model when said control model does not satisfy the constraint included in said setting information received in said setting information receiving process.

3. The program generating apparatus according to claim 1, wherein said control model includes:

a third one of said control blocks; and a fourth one of said control blocks capable of transmitting and receiving data to and from said third control block using a global variable, said fourth control block being not connected to said third control block, and when among said controllers in said allocated control model, controllers to which said third and fourth control blocks are allocated are different from each other, said communication function adding process adds data communication processing to be performed between said controllers to which said third and fourth control blocks are allocated.

4. The program generating apparatus according to claim 1, wherein a controller to which one of said control blocks of said control model is to be allocated is specified by an external input.

5. A program generating method for generating a program for controlling a control target apparatus including a plurality of controllers and input-output devices connected to said respective controllers, said program generating method comprising:

receiving a control model obtained by connecting a plurality of control blocks on said control target apparatus, said control model being translatable into said program;

receiving setting information of said plurality of controllers, and connection information between said controllers and between said controllers and said input-output devices;

allocating said respective control blocks of said control model to said controllers based on said control model, said setting information, and said connection information that are received; and adding, when first and second ones of said control blocks are connected to each other, a communication control block to a connected part between said first and second control blocks, and determining data processing to be performed by said communication control block, based on said received control model and said received setting information, said first and second control blocks being allocated to different ones of said controllers in said allocated control model, said communication control block including a function of performing said data processing on communication data output from one of said first and second control blocks and of inputting said communication data to the other of said first and second control blocks, said data processing being relevant to a control period.

\* \* \* \* \*